US008595372B2

(12) United States Patent
Price

(10) Patent No.: US 8,595,372 B2
(45) Date of Patent: Nov. 26, 2013

(54) STREAMING MEDIA BUFFERING SYSTEM

(75) Inventor: Harold Edward Price, Bethel Park, PA (US)

(73) Assignee: WAG Acquisition, LLC, Flanders, NJ (US)

( * ) Notice: Subject to any disclaimer, the term of this patent is extended or adjusted under 35 U.S.C. 154(b) by 1331 days.

(21) Appl. No.: 10/825,869

(22) Filed: Apr. 16, 2004

(65) Prior Publication Data

US 2004/0260828 A1     Dec. 23, 2004

Related U.S. Application Data

(63) Continuation of application No. 09/819,337, filed on Mar. 28, 2001, now Pat. No. 6,766,376.

(60) Provisional application No. 60/231,197, filed on Sep. 12, 2000.

(51) Int. Cl.
G06F 15/16 (2006.01)

(52) U.S. Cl.
USPC ........................................ 709/231

(58) Field of Classification Search
USPC ................................. 709/231–234
See application file for complete search history.

(56) References Cited

U.S. PATENT DOCUMENTS

| | | | |
|---|---|---|---|
| 4,963,995 A | 10/1990 | Lang | 358/305 |
| 5,057,932 A | 10/1991 | Lang | 358/335 |
| 5,065,396 A | 11/1991 | Castellano | |
| 5,164,839 A | 11/1992 | Lang | 386/54 |
| 5,262,875 A | 11/1993 | Mincer et al. | 386/101 |
| 5,361,259 A | 11/1994 | Hunt | |
| 5,414,455 A | 5/1995 | Hooper | |
| 5,440,334 A | 8/1995 | Walters et al. | 725/92 |
| 5,481,543 A * | 1/1996 | Veltman | 370/473 |
| 5,493,514 A | 2/1996 | Keith | |
| 5,526,353 A | 6/1996 | Henley et al. | 370/60.1 |
| 5,550,982 A | 8/1996 | Long | |
| 5,579,239 A | 11/1996 | Freeman | |
| 5,583,859 A | 12/1996 | Feldmeier | |
| 5,610,841 A | 3/1997 | Tanaka | |

(Continued)

FOREIGN PATENT DOCUMENTS

| | | |
|---|---|---|
| CA | 2247588 C | 1/2004 |
| EP | 614317 A2 | 9/1994 |

(Continued)

OTHER PUBLICATIONS

Salehi et al. "Supporting Stored Video: Reducing Rate Variability and End-to-End Resources Requirements through Optimal Smoothing," IEEE/ACM Transactions on Networking, vol. 6, issue 4, p. 397-410, Aug. 1998.

Rexford et al., "Smoothing Variable-Bit-Rate Video in an Internetwork," IEEE/ACM Transactions on Networking, vol. 7, issue 2, p. 202-215, Apr. 1999.

(Continued)

*Primary Examiner* — Douglas Blair
(74) *Attorney, Agent, or Firm* — Ernest D. Buff; Ernest D. Buff & Assoc. LLC.; Gordon E. Fish

(57) ABSTRACT

Streaming media, such as audio or video files, is sent via the Internet. The media are immediately played on a user's computer. Audio/video data is transmitted from the server more rapidly than it is played out by the user system. The audio/video data in the user buffer accumulates; and interruptions in playback as well as temporary modem delays are avoided.

47 Claims, 3 Drawing Sheets

(56) References Cited

U.S. PATENT DOCUMENTS

| | | | |
|---|---|---|---|
| 5,613,032 A | 3/1997 | Cruz | |
| 5,627,936 A | 5/1997 | Prasad | |
| 5,663,951 A | 9/1997 | Danneels | |
| 5,668,948 A | 9/1997 | Belknap | |
| 5,710,970 A | 1/1998 | Walters et al. | 725/87 |
| 5,719,786 A | 2/1998 | Nelson | |
| 5,734,119 A | 3/1998 | France | |
| 5,737,536 A | 4/1998 | Herrmann | |
| 5,751,951 A | 5/1998 | Osborne | |
| 5,751,968 A | 5/1998 | Cohen | |
| 5,768,527 A | 6/1998 | Zhu | |
| 5,778,374 A | 7/1998 | Dang | |
| 5,793,980 A | 8/1998 | Glaser et al. | 395/200.61 |
| 5,805,823 A | 9/1998 | Seitz | |
| 5,809,239 A | 9/1998 | Dan | |
| 5,815,662 A * | 9/1998 | Ong | 725/92 |
| 5,819,160 A | 10/1998 | Foladare | |
| 5,821,986 A | 10/1998 | Yuan | |
| 5,822,537 A * | 10/1998 | Katseff et al. | 709/231 |
| 5,835,495 A | 11/1998 | Ferriere | |
| 5,867,230 A | 2/1999 | Wang | |
| 5,881,245 A | 3/1999 | Thompson | |
| 5,892,915 A | 4/1999 | Duso | |
| 5,910,876 A * | 6/1999 | Sharma et al. | 361/86 |
| 5,922,048 A | 7/1999 | Emura | 709/219 |
| 5,923,655 A | 7/1999 | Veschi et al. | 370/394 |
| 5,928,330 A | 7/1999 | Goetz | |
| 5,933,603 A | 8/1999 | Vahalia | |
| 5,938,734 A | 8/1999 | Yao | |
| 5,956,716 A | 9/1999 | Kenner | |
| 5,963,202 A | 10/1999 | Polish | 715/723 |
| 5,974,503 A | 10/1999 | Venkatesh | |
| 5,978,567 A | 11/1999 | Rebane et al. | 709/219 |
| 5,987,510 A | 11/1999 | Imai | |
| 5,995,705 A | 11/1999 | Lang | 386/46 |
| 5,996,015 A | 11/1999 | Day | |
| 5,999,525 A | 12/1999 | Krishnaswamy et al. | 370/352 |
| 6,002,720 A | 12/1999 | Yurt et al. | 375/240 |
| 6,014,693 A | 1/2000 | Ito et al. | 709/219 |
| 6,014,694 A | 1/2000 | Aharoni et al. | 709/219 |
| 6,014,706 A | 1/2000 | Cannon et al. | 709/231 |
| 6,029,194 A | 2/2000 | Tilt | 709/219 |
| 6,032,193 A | 2/2000 | Sullivan | |
| 6,047,317 A | 4/2000 | Bisdikian et al. | 709/217 |
| 6,047,356 A | 4/2000 | Anderson | |
| 6,057,832 A | 5/2000 | Lev et al. | 345/327 |
| 6,061,731 A | 5/2000 | Blakeslee | 709/231 |
| 6,061,732 A | 5/2000 | Korst et al. | 709/231 |
| 6,065,050 A | 5/2000 | DeMoney | 709/219 |
| 6,085,221 A * | 7/2000 | Graf | 709/202 |
| 6,151,632 A | 11/2000 | Chaddha | |
| 6,173,328 B1 | 1/2001 | Sato | |
| 6,173,340 B1 * | 1/2001 | Gready et al. | 710/6 |
| 6,233,226 B1 * | 5/2001 | Gringeri et al. | 370/252 |
| 6,279,040 B1 * | 8/2001 | Ma et al. | 709/231 |
| 6,292,834 B1 | 9/2001 | Ravi et al. | 709/233 |
| 6,321,269 B1 | 11/2001 | Walker | |
| 6,377,995 B2 | 4/2002 | Agraharam | |
| 6,385,596 B1 | 5/2002 | Wiser | |
| 6,389,473 B1 | 5/2002 | Carmel | |
| 6,405,256 B1 | 6/2002 | Lin | |
| 6,430,620 B1 | 8/2002 | Omura | |
| 6,449,719 B1 * | 9/2002 | Baker | 713/168 |
| 6,452,943 B1 | 9/2002 | Furuya | |
| 6,535,920 B1 | 3/2003 | Parry | |
| 6,588,015 B1 | 7/2003 | Eyer et al. | 725/89 |
| 6,594,699 B1 | 7/2003 | Sahai et al. | 709/228 |
| 6,598,228 B2 | 7/2003 | Hejna | 725/91 |
| 6,625,750 B1 | 9/2003 | Duso | |
| 6,637,031 B1 | 10/2003 | Chou | |
| 6,665,751 B1 | 12/2003 | Chen et al. | 710/52 |
| 6,708,213 B1 | 3/2004 | Bommaiah et al. | 709/266 |
| 6,728,753 B1 | 4/2004 | Parasnis | |
| 6,757,796 B1 | 6/2004 | Hofmann | |
| 6,766,376 B2 | 7/2004 | Price | 709/231 |
| 6,829,368 B2 | 12/2004 | Meyer et al. | 382/100 |
| 6,831,892 B2 * | 12/2004 | Robinett et al. | 370/232 |
| 6,845,398 B1 | 1/2005 | Galensky | |
| 6,850,965 B2 | 2/2005 | Allen | 709/203 |
| 6,889,257 B1 | 5/2005 | Patel | 709/232 |
| 6,907,481 B2 | 6/2005 | Kovacevic | 710/60 |
| 6,925,495 B2 | 8/2005 | Hegde | |
| 6,938,047 B2 | 8/2005 | Kryeziu | |
| 6,988,144 B1 | 1/2006 | Luken | |
| 6,990,497 B2 | 1/2006 | O'Rourke | |
| 7,020,710 B2 | 3/2006 | Weber | |
| 7,039,784 B1 | 5/2006 | Chen | |
| 7,054,500 B1 | 5/2006 | Lillevoid | 382/260 |
| 7,085,842 B2 | 8/2006 | Reid | |
| 7,111,058 B1 | 9/2006 | Nguyen et al. | 709/224 |
| 7,113,983 B1 | 9/2006 | Terada | |
| 7,170,856 B1 | 1/2007 | Ho et al. | 370/230 |
| 7,212,574 B2 | 5/2007 | Abrams, Jr | |
| 7,260,564 B1 | 8/2007 | Lynn | |
| 7,272,298 B1 | 9/2007 | Lang et al. | 386/83 |
| 7,287,083 B1 | 10/2007 | Nay | |
| 7,318,017 B2 | 1/2008 | Swoboda | |
| 7,334,016 B2 | 2/2008 | Fishhaut | |
| 7,334,044 B1 | 2/2008 | Allen | 709/233 |
| 7,346,698 B2 | 3/2008 | Hannaway | 709/231 |
| 7,349,663 B1 | 3/2008 | Joseph | |
| 7,373,413 B1 | 5/2008 | Nguyen et al. | 709/231 |
| 7,376,710 B1 | 5/2008 | Cromwell | |
| 7,471,834 B2 | 12/2008 | Sull | |
| 7,478,164 B1 | 1/2009 | Lango | |
| 7,496,676 B2 | 2/2009 | Kryeziu | |
| 7,590,656 B2 | 9/2009 | Plastina | |
| 7,647,297 B2 | 1/2010 | LaChapelle | |
| 7,689,510 B2 | 3/2010 | Lamkin | |
| 7,818,444 B2 | 10/2010 | Brueck | |
| 7,890,631 B2 | 2/2011 | Allen | |
| 7,917,557 B2 | 3/2011 | Shteyn | |
| 2001/0047377 A1 | 11/2001 | Sincaglia | |
| 2002/0007418 A1 | 1/2002 | Hegde | |
| 2002/0023165 A1 | 2/2002 | Lahr | |
| 2002/0029166 A1 | 3/2002 | Jacobs | |
| 2002/0069218 A1 | 6/2002 | Sull | |
| 2002/0078174 A1 | 6/2002 | Sim | |
| 2002/0083182 A1 | 6/2002 | Alvarado | |
| 2002/0120675 A1 | 8/2002 | Everett | |
| 2002/0131443 A1 | 9/2002 | Robinett | |
| 2002/0147634 A1 | 10/2002 | Jacoby | |
| 2002/0177914 A1 | 11/2002 | Chase | |
| 2003/0014488 A1 | 1/2003 | Dalal | |
| 2003/0018978 A1 | 1/2003 | Singal | |
| 2003/0061305 A1 | 3/2003 | Copley | |
| 2003/0068046 A1 | 4/2003 | Lindqvist | |
| 2003/0093790 A1 | 5/2003 | Logan | |
| 2003/0186645 A1 | 10/2003 | Mori | |
| 2004/0078812 A1 | 4/2004 | Calvert | |
| 2004/0086120 A1 | 5/2004 | Akins | |
| 2004/0123725 A1 | 7/2004 | Kim | |
| 2004/0131340 A1 | 7/2004 | Antoun | |
| 2004/0162910 A1 | 8/2004 | Kryeziu | |
| 2004/0186733 A1 | 9/2004 | Loomis | |
| 2004/0231004 A1 | 11/2004 | Seo | |
| 2004/0260835 A1 | 12/2004 | Welk | |
| 2005/0005025 A1 | 1/2005 | Harville | |
| 2005/0080876 A1 | 4/2005 | Peiffer | |
| 2005/0108320 A1 | 5/2005 | Lord | |
| 2005/0190915 A1 | 9/2005 | Pare | |
| 2005/0203917 A1 | 9/2005 | Freeberg | |
| 2005/0251832 A1 | 11/2005 | Chiueh | |
| 2005/0262251 A1 | 11/2005 | Klemets | |
| 2006/0095472 A1 | 5/2006 | Krikorian | |
| 2006/0143667 A1 | 6/2006 | Kurosawa | |
| 2006/0153537 A1 | 7/2006 | Kaneko | |
| 2007/0005428 A1 | 1/2007 | Jacobs | |
| 2007/0016865 A1 | 1/2007 | Johnson | |
| 2007/0038728 A1 | 2/2007 | Jacobs | |
| 2007/0079327 A1 | 4/2007 | Khoo | |
| 2007/0088804 A1 | 4/2007 | Qureshey | |
| 2007/0226365 A1 | 9/2007 | Hildreth | |
| 2007/0233784 A1 | 10/2007 | O'Rourke | |

(56) References Cited

U.S. PATENT DOCUMENTS

| | | |
|---|---|---|
| 2007/0274672 A1 | 11/2007 | Itoi |
| 2008/0059532 A1 | 3/2008 | Kazmi |
| 2008/0133701 A1 | 6/2008 | Kazmi |
| 2008/0195743 A1 | 8/2008 | Brueck |

FOREIGN PATENT DOCUMENTS

| | | |
|---|---|---|
| EP | 680185 A2 | 11/1995 |
| EP | 720374 A1 | 7/1996 |
| EP | 762300 A2 | 3/1997 |
| EP | 827336 A2 | 3/1998 |
| EP | 859535 A2 | 8/1998 |
| EP | 984584 A1 | 3/2000 |
| EP | 1113642 A2 | 7/2001 |
| EP | 1427218 A2 | 6/2004 |
| JP | 10336626 A | 12/1998 |
| JP | 11184780 A | 7/1999 |
| JP | 2000151595 A | 5/2000 |
| JP | 2000172599 A | 6/2000 |
| JP | 2000228669 A | 8/2000 |
| WO | 9712447 A2 | 4/1997 |
| WO | 9717775 A1 | 5/1997 |
| WO | 9730551 A1 | 8/1997 |
| WO | 9844733 A1 | 10/1998 |
| WO | 0138993 A1 | 5/2001 |
| WO | 02057943 A1 | 7/2002 |
| WO | 03023781 A1 | 3/2003 |
| WO | 2005004485 A1 | 1/2005 |

OTHER PUBLICATIONS

Bianchi, "Buffer Sizing for High Speed Video Information Retrieval on ATM Networks," Globecom—New York-, 1997, vol. 2, pp. 1057-1061.

Mielke et al., A Multi-level Buffering and Feedback Scheme for Distributed Multimedia Presentation Systems, IEEE, 1998.

Nam et al, Adaptive Multimedia Stream Presentation in Mobile Computing Environment, IEEE TENCON, Sep. 1999.

Deleon et al., An Adaptive Predictor for Media Playout Buffering, 1999.

Zhao et al., Bandwidth-Efficient Continuous Media Streaming through Optimal Multiplexing, 1999.

Gollapudi et al., Buffer Management in Multimedia Database Systems, 1996.

Hui et al., Client-Server Synchronization and Buffering for Variable Rate Multimedia Retrievals, IEEE Journal on Selected Areas in Communications, vol. 14, No. 1, Jan. 1996.

Zheng et al., Multimedia Over High Speed Networks: Reducing Network Requirements With Fast Buffer Fillup, 1998.

Zheng et al., Traffic Management of Multimedia over ATM Networks, Jan. 1999.

Chen et al., Video and Audio: Organization and Retrieval in the WWW, 1996.

Yee et al., Server and Buffer Allocation in Client Server Multimedia System, IEEE, 1993.

Rejaie et al., Rap: An end-to-end rate-based congestion control mechanism for realtime streams in the Internet, IEEE, Mar. 1999.

\* cited by examiner

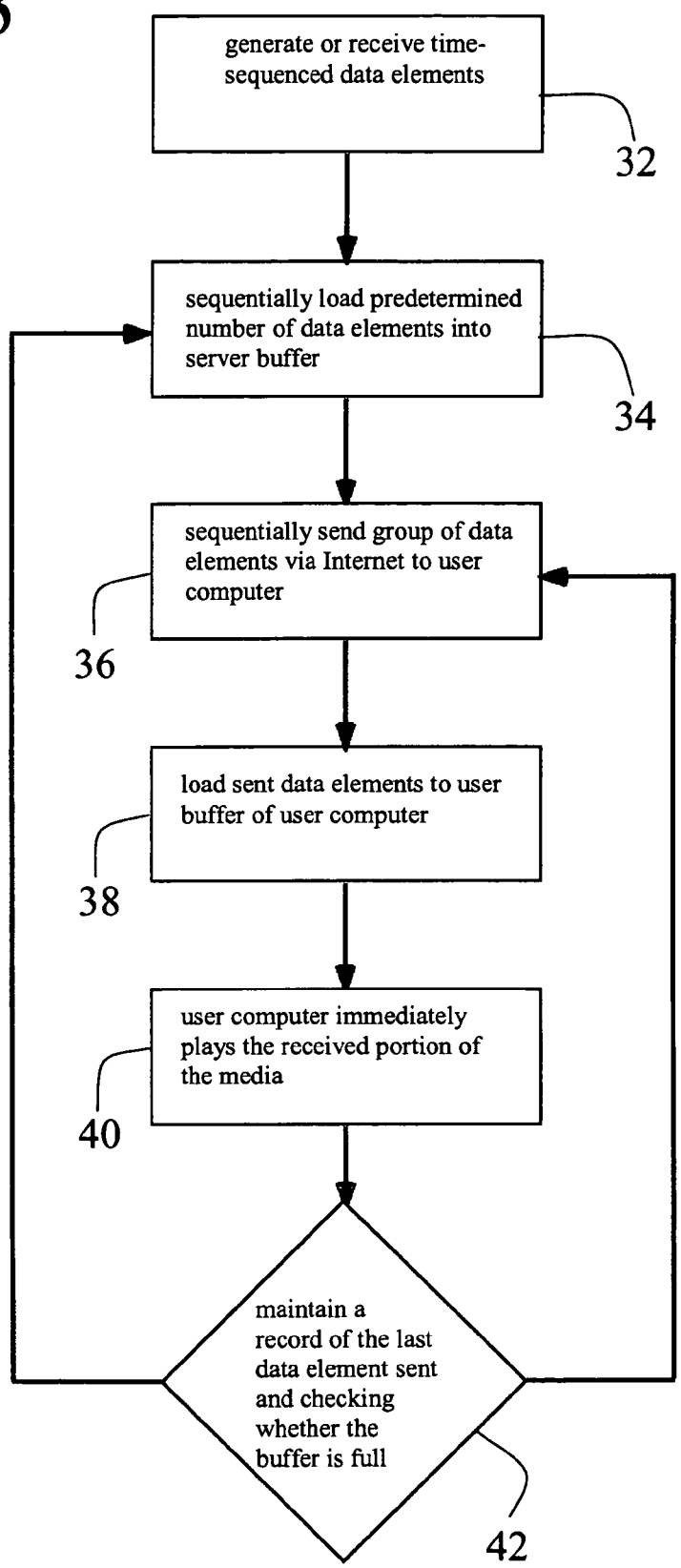

STREAMING MEDIA BUFFERING SYSTEM

CROSS-REFERENCE TO RELATED APPLICATIONS

This application is a continuation of application Ser. No. 09/819,337, filed Mar. 28, 2001 entitled "Streaming Media Buffering System", now U.S. Pat. No. 6,766,376, which claimed the benefit under 35 U.S.C. §119(e) of U.S. provisional application Ser. No. 60/231,197, filed Sep. 12, 2000, and accordingly the present application claims the benefit of the respective filing dates of said application Ser. No. 09/819,137, and said provisional application Ser. No. 60/231,197. Said application Ser. No. 09/819,337 is hereby incorporated by reference herein in its entirety.

BACKGROUND OF THE INVENTION

1. Field of the Invention

The present invention relates to multimedia computer communication systems; and more particularly, to a buffering system for streaming media, such as audio/video, on the Internet.

2. Description of the Prior Art

Prior to the development of Internet streaming media technologies, audio and video were formatted into files, which users needed to download to their computer before the files could be heard or viewed. Real time, continuous media, as from a radio station, was not suitable for this arrangement in that a file of finite size must be created so it could be downloaded. The advent of streaming media technologies allowed users to listen or view the files as they were being downloaded, and allowed users to "tune-in" to a continuous media broadcast, or "stream", such as from a radio station.

Since audio and video media must play out over a period of time it is more appropriate to think of bandwidth requirements than file size. The bandwidth requirement of an audio or video media refers to the data rate in bits per second that must be transmitted and received in order to listen or view the material uninterrupted. Transmitting the audio or video material over a connection slower than the bandwidth requirement results in unsatisfactory viewing or listening, if viewing or listening is possible at all. The connection available to most Internet users is by dial-up modem, which has a maximum receive data rate of 56,000 bits per second. Most audio and video available on the Internet has been compressed to be listenable or viewable within the 56,000 bits per second modem bandwidth. Requirements for achieving adequate audio and video over the Internet generally consume a considerable portion of the available bandwidth.

Internet connection quality can vary rapidly over time, with two primary factors responsible for degradation of the instantaneous bandwidth actually available to the user. These factors are the quality of the user's modem connection over telephone lines, which can have periods of interference causing reduced available bandwidth, and momentary Internet congestion at various points along the route over which the user's data flows. Each of these factors can cause delays and interruptions in the transmission of data to the user. Internet data communications devices such as routers are designed to drop data "packets" if they get overloaded. For material that is not time sensitive, these dropped packets will usually be resent, and the user will eventually be presented with the material. However, since streaming media is time sensitive, dropped packets can have a significant impact on the receipt and playback of an audio or video stream. These degradations in the receipt of Internet data are very common, and prevent most users from being able to listen to or view streaming media without interruption unless some special provisions have been incorporated into the user's computer software to accommodate data transmission interruptions.

These interruptions are commonly referred to as "dropouts", meaning that the data flow to the user has been interrupted (i.e., the audio "drops out"). Dropouts can be extremely annoying—for example, while listening to music. The current state-of-the-art solution to the problem uses a pre-buffering technique to store up enough audio or video data in the user's computer so that it can play the audio or video with a minimum of dropouts. This process requires the user to wait until enough of the media file is buffered in memory before listening or viewing can begin. The media data is delivered by a server computer which has available to it the source of the media data, such as by a connection to a radio station. When the user connects to the server via the Internet, audio/video output at the user's system is delayed while the user's buffer is filled to a predetermined level. Typical pre-buffering wait times range from 10 to 20 seconds or more, determined by the vendor providing the audio or video media. Even with this pre-buffering process, interruptions in playback still occur.

In this process, the user has a software application on the computer commonly called a "media player". Using the features built into the media player, the user starts the audio or video stream, typically by clicking on a "start" button, and waits 10-20 seconds or so before the material starts playing. During this time data is being received from the source and filling the media player's buffer. The audio or video data is delivered from the source at the rate it is to be played out. If, for example, the user is listening to an audio stream encoded to be played-out at 24,000 bits per second, the source sends the audio data at the rate of 24,000 bits per second. Provided that the user waits 10 seconds, and the receipt of the buffering data has not been interrupted, there is enough media data stored in the buffer to play for 10 seconds.

Gaps in the receipt of audio/video data, due to Internet slowdowns, cause the buffer to deplete. Because transmission of audio/video media data to the user takes place at the rate it is played out, the user's buffer level can never be increased or replenished while it is playing. Thus, gaps in the receipt of audio/video media data inexorably cause the buffer level to decrease from its initial level. In time, extended or repeated occurrences of these gaps empty the user's buffer. The audio/video material stops playing, and the buffer must be refilled to its original predetermined level before playing of the media resumes.

By way of illustration in a 10 second pre-buffering scenario, if the data reception stopped the instant that the media started playing, it would play for exactly 10 seconds. Once it starts playing, the media data plays out of the buffer as new media data replenishes the buffer. The incoming data rate equals the rate at which the data is played out of the user's buffer, assuming the receipt of data across the Internet is unimpeded. If there are no interruptions in the receipt of the media data for the duration of the time the user listens to or watches the material, the buffer level remains constant and there will still be 10 seconds of data stored in the media player's buffer when the user stops the player. On the other hand, if the media player encounters interruptions totaling 6 seconds while playing the material, there would only be 4 seconds of media data remaining in the buffer when the user stopped it. If data reception interruptions at any time during the playing exceed 10 seconds, the user's media player buffer becomes exhausted. There is no media data to play, and the audio or video stops—a dropout has occurred. At this point a software mechanism in the media player stops attempting to play any more of the material, and starts the buffering process again. The media player remains silent until the buffer refills, at which time the media player will once again start playing the material.

There are two fundamental types of streaming media: (i) material that originates from a source having a real-time nature, such as a radio or TV broadcast, and (ii) material that originates from a non-real-time source such as from a disk file. An example of non-real-time material might be a piece of music stored as a disk file, or a portion of a broadcast that originally was real-time, perhaps yesterday's TV evening news, and was recorded into a disk file. For purposes of clarity within this document, streaming media of type (i) will be referred to as "broadcast" media, and streaming media of type (ii) will be referred to as "file based" media.

Both streaming media types are handled similarly in conventional systems, and both are handled similarly by the streaming media buffering system of the present invention. The two streaming media types are readily distinguished. Broadcast streaming media has as its source a system or arrangement that by definition can only be transmitted to users as fast as the material is generated; for example, a disk jockey speaking into a microphone. File based media, on the other hand, can be transmitted to users at any data rate, since there is no inherent time element to a file residing on a computer disk. With conventional Internet streaming media systems for streaming media of either type, media data is transmitted from the server to the user at the rate at which it will be played out, regardless of the data rate capabilities of the connection between the server and the user.

Conventional streaming media systems may buffer media data at the server for the purpose of packet assembly/disassembly. Media data may also be buffered at the server to permit programming conveniences such as dealing with chunks of data of a specific size. Server buffering of media data is not used by conventional streaming media systems to mitigate long term Internet performance degradation as described hereinafter.

The sending of audio or video files via a network is known in the art. U.S. Pat. No. 6,029,194 to Tilt describes a media server for the distribution of audio/video over networks, in which retrieved media frames are transferred to a FIFO buffer. A clock rate for a local clock is adjusted according to the fullness of the buffer. The media frames from the buffer are sent in the form of data packets over the networks in response to interrupts generated by the local clock. In this manner, the timing for the media frames is controlled by the user to assure a continuous stream of video during editing. U.S. Pat. No. 6,014,706 to Cannon, et al. discloses an apparatus and method for displaying streamed digital video data on a client computer. The client computer is configured to receive the streamed digital video data from a server computer via a computer network. The streamed digital video data is transmitted from the server computer to the client computer as a stream of video frames. U.S. Pat. No. 6,002,720, to Yurt, et al. discloses a system of distributing video and/or audio information wherein digital signal processing is employed to achieve high rates of data compression. U.S. Pat. No. 5,923,655, to Veschi et al. discloses a system and method for communicating audio/video data in a packet-based computer network wherein transmission of data packets through the computer network requires variable periods of transmission time. U.S. Pat. No. 5,922,048 to Emura discloses a video server apparatus having a stream control section which determines a keyframe readout interval and a keyframe playback interval that satisfy a playback speed designated by a terminal apparatus. Finally, U.S. Pat. No. 6,014,694 to Aharoni, et al. discloses a system and method for adaptively transporting video over networks, including the Internet, wherein the available bandwidth varies with time.

There remains a need in the art for a method and system that afford immediate and uninterrupted listening/viewing of streaming media by the user.

SUMMARY OF THE INVENTION

The present invention provides a system and method for sending streaming media, such as audio or video files, via the Internet. Immediate playing of the media on a user's computer is afforded while reducing interruptions in playback due to Internet congestion and temporary modem delays due to noisy lines. Nearly instantaneous playback is achieved, while maintaining protection against playback interruption. Delayed starts, heretofore required to provide protection against interruption, are avoided. Data loss due to interruptions in the receipt of media data by the media player can be recovered while the player continues to play out the audio or video material. If the interruptions are so severe as to deplete the user's buffer and stop the play out, the media player will begin to play out again as soon as the media player begins to receive media data without waiting to first build up the buffer.

Generally stated, the invention provides a system for distributing via the Internet streaming media composed of a plurality of time-sequenced data elements. The system has a server connected to the Internet for transmitting the data elements. Associated with the server are a buffer manager and a FIFO buffer for storing at least one of the data elements for transmission. The buffer manager comprises means for: receiving the media data; supplying media data in order to the FIFO buffer; supplying the FIFO buffer with a predetermined number of data elements at a constant time-sequenced fill rate; maintaining a pointer into the buffer for each user computer indicating the last media data element that has been sent to that user, thus indicating the next element or elements to be sent; and, once the FIFO buffer is full, deleting the oldest data element in the buffer as each new data element is received, said means arranged to maintain the pre-determined number of data elements in the FIFO buffer. At least one user computer is connected to the server via the Internet or other data communications medium.

This invention presumes the existence of a data communications transport mechanism, such as the TCP protocol, for the reliable delivery of data in an ordered sequence from the source of the media data to the server, or from the server to the media player software of the user computer. Thus, the delivery of data in the proper sequence is outside the scope of this invention.

The user computer is associated with a media player software incorporating a user buffer and comprises means for receiving and storing a predetermined number of media data elements which are received sequentially by the media player, playing the data out sequentially as audio and/or video, and deleting media data elements from the buffer as they are played out. As data is played out, the next sequential data elements are received from the server in such a fashion as to approximately maintain the predetermined number of data elements in the user's buffer.

The server stores a predetermined amount of media data in a First-In First-Out (FIFO) buffer in an arrangement that receives media data at a fixed rate. Once the buffer is full, for each new data element received into the buffer the oldest data element is deleted from the buffer. Requests from user computers to connect are not accepted until the server buffer is full. Once a connection is made to a user's computer, the server sends the media data to the user computer as buffer in the following manner. First, media data is sent to the user at the highest rate that the data connection between the server and the user computer will support until the predetermined amount of data that had been stored in the server buffer has been transferred to the user's computer. Once the buffer has been transferred a steady state condition is reached wherein as each media data element arrives at the server, it is immediately sent out to the user computer. In this steady state condition, the media data is sent at a rate that matches the constant fill rate of the server buffer, and is received at the same rate by the user computer if there are no interruptions in the transmission of media data between the server and the user's computer. If interruptions have interfered with the arrival of sent media data to the user's computer, that data may have been "dropped" by routers in the Internet and needs to be resent. This causes data to "back up" into the server FIFO for that user.

The resending of missing data is the responsibility of the reliable transport mechanism, such as TCP. The server buffer "sends" data by delivering it to the transport mechanism. The transport mechanism actually "sends" the data across the communications medium, and has processes which determine if all the data that has been sent has been received by the destination. If not, missing pieces of data are automatically resent to the destination, and are arranged to be delivered to the target software on the destination system in an ordered fashion. In the circumstance of this invention, the destination is the user computer, and the target software on the destination system is the media player. If the transport mechanism determines that data is missing, it retransmits that data to the destination as fast as the connection between the server and destination will allow. The net effect of this invention is that all media data to be delivered to a user computer is always sent as fast as the communications medium will support, either by the server buffer passing media data to the transport mechanism, or by the transport mechanism delivering or redelivering the media data to the user computer. This is enabled by buffering data at the server, and is distinctly different from prior art in which media data is only sent from the server to the user computer at the rate at which it is to be played out.

Routinely, once a steady state has been achieved, the next data element to be sent is the next sequential data element from that which has already been received by the user's computer buffer. However, if there is more data to be sent than at the routine constant fill rate, such as in the condition where some media data has been resent by the reliable transport layer, the server transport mechanism will again send the buffered media data as fast as the connection between the server and the user's computer will support. This allows for rebuilding the user's computer buffer under circumstances wherein Internet interruptions have blocked the normal flow of data. When compared to conventional systems, which provide no capability to rebuild the user's computer buffer when data is lost, the streaming media buffering system of the present invention provides for recovery of lost data elements and the restoration of the user's buffer, even while the user media player continues to play.

Under conditions in which interruptions have interfered with the arrival of sent media data to the user's computer, data loss exceeding certain levels will cause the transport mechanism software to stop accepting data for transmission from the application software, namely the streaming media server software. The streaming media server software keeps track of the last data element in the FIFO buffer that has been "sent" to each user using a software pointer. An interruption in the ability to send media data to a user results in this pointer "backing up" in the FIFO in such a way that the server knows from what point in the buffer to restart sending data when the transport mechanism again requests data to send. When the server software receives that notification, it will begin sending data to the user starting from the next data element to send as indicated by the pointer, and sending as much data as the transport mechanism will accept. The transport mechanism will again send this data as fast as it can to the user. This process continues until the steady state condition is again reached wherein each data element is sent to the user as soon as it arrives from the media source.

In another embodiment, the server is connected to the Internet, and to a broadcast media source, such as a radio station. A radio station computer is provided with a means for receiving media data elements as they are generated by the audio and/or video source, and for transmitting those media data elements to the server at a constant time-sequenced rate, using a reliable transport mechanism such as TCP. As before, the server provides a buffer manager and a FIFO buffer, and provides a means for receiving the sequentially arranged media data elements from the broadcast media source and storing those data elements in the FIFO buffer. The buffer manager comprises means for: supplying the FIFO buffer with a predetermined number of data elements at a constant time-sequenced fill rate; maintaining a pointer into the buffer for each user computer indicating the last media data element that has been sent to that user, thus indicating the next element or elements to be sent; and, once the FIFO buffer is full, deleting the oldest data element in the buffer as each new data element is received. Importantly, the buffer manager is arranged to maintain the pre-determined number of data elements in the FIFO buffer. At least one user computer is connected to the server via the Internet or other data communications medium.

The user computer is associated with a media player software incorporating a user buffer and comprises means for receiving and storing a predetermined number of media data elements which are received sequentially by the media player, playing the data out sequentially as audio and/or video, and deleting media data elements from the buffer as they are played out. As data is played out, the next sequential data elements are received from the server in such a fashion as to approximately maintain the predetermined number of data elements in the user's buffer.

In another embodiment, the server is connected to the Internet and provisioned as initially described, and has available to it file based media data as the source material. The file based media data can be read by the server which can deliver media data elements to the server FIFO buffer at a constant time-sequenced rate, as if the data were arriving from a broadcast media source. As before, the server provides a buffer manager and a FIFO buffer, and provides a means for receiving the sequentially arranged media data elements from the file based media source and storing those data elements in the FIFO buffer. The buffer manager comprises means for: receiving the media data; supplying media data in order to the FIFO buffer; supplying the FIFO buffer with a predetermined number of data elements at a constant time-sequenced fill rate; maintaining a pointer into the buffer for each user computer indicating the last media data element that has been sent to that user, thus indicating the next element or elements to be sent; and, once the FIFO buffer is full, deleting the oldest data element in the buffer as each new data element is received, said means arranged to maintain the pre-determined number of data elements in the FIFO buffer. The server buffer manager, or a separate process on the server, or a process on another computer having access to the file based media data, provides for reading the media data file and making available to the FIFO buffer sequentially arranged media data elements. At least one user computer is connected to the server via the Internet.

The user computer is associated with a media player software incorporating a user buffer and comprises means for receiving and storing a predetermined number of media data elements which are received sequentially by the media player, playing the data out sequentially as audio and/or video, and deleting media data elements from the buffer as they are played out. As data is played out, the next sequential data elements are received from the server in such a fashion as to approximately maintain the predetermined number of data elements in the user's buffer.

In another embodiment, the server is connected to the Internet and provisioned as initially described. The server buffer manager, or the media source, provides for sequentially numbering the media data elements. The server buffer manager does not maintain a pointer into the server buffer for each user. Instead, the media player buffer manager in the user computer maintains a record of the serial number of the last data element that has been received. Via the use of standard data communications protocol techniques such as TCP, the user computer transmits a request to the server to send one or more data elements, specifying the serial numbers of the data elements. The server responds by sending the requested data elements, and depends upon the reliable transmission protocol to assure delivery. The user computer then continues with additional data requests for the duration of playing the audio/video material. In this manner, the user computer, not the server, maintains the record of the highest data element number stored in the user computer buffer. The media data will be transmitted to the user computer as fast as the data connection between the user computer and the server will allow. As before, the server provides a buffer manager and a FIFO buffer, and provides a means for receiving the sequentially numbered media data elements from a broadcast media source or a file based media source, and storing those data elements in the FIFO buffer. The buffer manager comprises means for: receiving the media data; supplying media data in order to the FIFO buffer; supplying the FIFO buffer with a predetermined number of data elements at a constant time-sequenced fill rate; and, once the FIFO buffer is full, deleting the oldest data element in the buffer as each new data element is received. Such means is arranged to maintain the predetermined number of data elements in the FIFO buffer. At least one user computer is connected to the server via the Internet.

The user computer is associated with a media player software incorporating a user buffer and comprises means for receiving and storing a predetermined number of media data elements which are received sequentially by the media player, playing the data out sequentially as audio and/or video, and deleting media data elements from the buffer as they are played out. As data is played out, the next sequential data elements are requested from the server in such a fashion as to approximately maintain the predetermined number of data elements in the user's buffer.

In yet another embodiment, the invention provides a method for distributing from a server via the Internet streaming media composed of a plurality of time-sequenced data elements. A predetermined number of the data elements are sequentially loaded into a FIFO buffer. Additional data elements continue to be received on a constant time basis. As each new data element is input to the buffer, the oldest data element is deleted from the buffer, maintaining in the buffer the same predetermined number of data elements. At the request of a user computer for connection to a media stream, a group of the data elements is sequentially sent via the Internet from the FIFO buffer to the user computer connected to the Internet. Upon being received by the user computer, the sent group of data elements is loaded into a user's buffer associated with the user computer. The users computer immediately begins to play the audio/video streaming media material. The server continues to send the next data elements in sequence until the contents of the FIFO buffer have been sent. The data elements are sent by the server as fast as the connection between the server and user computer will allow. Once the contents of the FIFO buffer have been sent to a user computer, as each new data element is received into the FIFO buffer it is immediately sent to the user computer in such a manner as to keep the user computer buffer full. The process repeats for substantially the entire time that the audio/video material is played.

Unlike conventional buffering systems, audio begins to play on the user system as soon as the user connection to the audio server is effected and a small amount of data has been transferred—conventional systems required many seconds of data. Audio/video media data is initially transmitted from the server more rapidly than it is played out by the user system, until the server buffer has been transferred to the user computer. The user's buffer is built up while the audio is playing, and can be restored if it is diminished by data transmission interruptions. Advantageously, the system and method of this invention afford faster data transmissions than the playback data rate of the media data. Audio/video data is transmitted from the server more rapidly than it is played out by the user system under conditions wherein the user's computer buffer is not full. The audio/video data in the user buffer accumulates; interruptions in playback due to temporary Internet and modem delays are avoided.

Although the preferred embodiment utilizes a reliable transport mechanism to move data between the server and the user, alternative embodiments could incorporate this invention's buffering system in combination with an unreliable datagram-based transport mechanism Hybrid systems, where a combination of this invention's buffering system, and unreliable datagram based transport mechanisms can also be used.

BRIEF DESCRIPTION OF DRAWINGS

The invention will be more fully understood and further advantages will become apparent when reference is had to the following detailed description and the accompanying drawings, in which:

FIG. 3 is a block diagram illustrating the method of the present invention.

DESCRIPTION OF THE PREFERRED EMBODIMENTS

The present invention relates to a buffering system for streaming media, such as audio/video, on the Internet.

Figure 1:
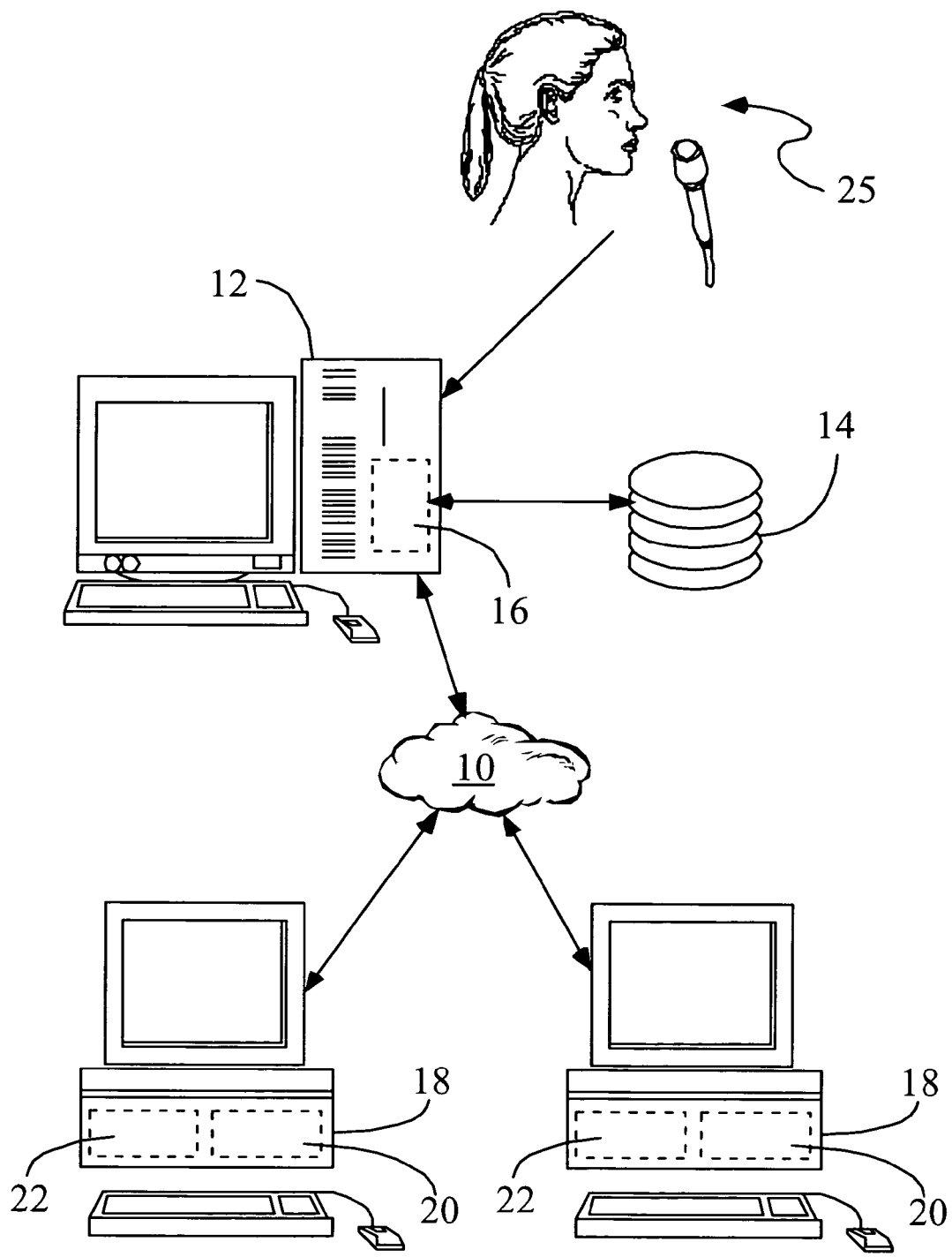
FIG. 1 is a schematic diagram illustrating the elements of a streaming media buffering system in accordance with the present invention.

In one embodiment, the invention provides a system for distributing via the Internet streaming media composed of a plurality of time-sequenced data elements. As shown in FIG. 1, the system is provided with a server 12 connected to the Internet 10 for transmitting the streaming media data elements. Associated with the server 12 is a FIFO buffer 14 for storing at least one of the data elements for transmission, and a buffer manager 16. Buffer 14 is a conventional computer storage mechanism such as a hard disk, as shown for convenience of illustration, or, preferably, an electronic storage arrangement such as Random Access Memory (RAM). The buffer manager 16 is in the form of software or firmware that provides means for: receiving the media data; supplying media data in order to the FIFO buffer; supplying the buffer 14 with a predetermined number of data elements at a constant time-sequenced fill rate; maintaining a pointer 24a through 24n into the buffer, one for each user computer indicating the last media data element that has been sent to that user, thus indicating the next element or elements to be sent; and, once the FIFO buffer is full, deleting the oldest data element in the buffer as each new data element is received, said means arranged to maintain the pre-determined number of data elements in the FIFO buffer. Buffer Manager 16 may also comprise means for: formatting media data according to the requirements of buffer 14, and for digitizing, encoding, and packetizing the media data.

There is at least one user computer 18 connected to the server 12 via the Internet 10. A user buffer 20 is associated with the user computer 18. The user buffer 20 is provided with means for storing a predetermined number of the data elements. User buffer 20 is a conventional computer storage mechanism such as a hard disk, or, preferably, an electronic storage arrangement such as Random Access Memory (RAM) as suggested by the illustration. A buffer manager 22 is associated with the user computer 18. The buffer manager 22, having the form of software or firmware, is provided with means for receiving and storing a predetermined number of media data elements which are received sequentially by the media player, playing the data out sequentially as audio and/or video, and deleting media data elements from the buffer as they are played out.

The media may come from a live source, shown as 26 in FIG. 1, or from a stored file on the server 12, or another storage device, such as a hard drive. For broadcast media, as the term is used herein, such as an announcer speaking into a microphone, or playing a CD, the media source 26 can only transmit audio/video data as fast as it is generated. If the media source is file based, such as a music clip stored as a disk file, and if that disk file is stored on the server or an associated server computer, this connection could be considered to be near instantaneous. In this case, rather than audio/video data filling and depleting the buffer 14, an amount of audio/video data equivalent to the desired buffer size is logically constituted as a FIFO buffer. Such a construct is commonly called a data window. The data window moves on a time-sequenced basis through the media data file, thus defining the contents of the buffer on a moment-by-moment basis and performing the equivalent functions to receiving a new data element and deleting the oldest data element.

The server 12 maintains a buffer of audio/video data comprising an amount adequate to bridge gaps typical of Internet and modem delays to the user. Preferably, this buffer holds enough data elements for about one minute of play. The server buffer 14 is filled the first time the media source connection is established or a disk file is read, and before any users are allowed to connect to the server 12.

Connections from the server 12 through the Internet 10 commonly are much faster than the data rate required for audio or video playback. This fact is insignificant for conventional servers because, not having a FIFO buffer or a buffer pointer for each user, audio/video data can only be sent as fast as it becomes available, or as fast as the pace at which it must be delivered to the user in order to be properly replayed. The user, typically interacting with "media player" software on their computer, selects an audio source requiring a data rate slower than that available by the user's connection to the Internet. For example, if the user's connection to the Internet is made via a 56,000 bits per second modem, the user might select a media source encoded for playback at 24,000 bits per second.

With the present invention, as soon as a user connects to the server 12, the server 12 transmits audio/video data as sequential data elements from its buffer 14 to the buffer 20 of the user as fast as the data connection will allow. Unlike the prior art, media begins to play on the user computer 18 as soon as the user connection is made to the audio server 12 and a minimal amount of data elements have been received and stored in the user's buffer 20. The user's buffer 20 is built up while the media is playing. As each data element is played, it is deleted from the user's buffer 20. Initially, the user buffer manager 22 requests the server 12 to send media data elements to start the playback stream, such as by selecting a radio station from a list. The server 12 responds by sending data elements to the user computer 18 as fast as it can, until the entire FIFO buffer 14 has been sent to the user computer. Upon receipt of the initial data elements, the user buffer manager 22 begins playback. Because this is a synchronous system with the source, server, and user computer operating by the same playback clock rate as determined by the encoding rate of the media, as each data element is played out and is deleted from the user buffer 20, another data element has been deposited into the server buffer 14 and is available to be sent to the user computer. Server 12 sends the newly available data elements as fast as the data rate of the connection between server 12 and user computer 18 will allow.

Since the connection from the Internet to the user is faster than that required for media playback, audio/video data is transmitted from the server faster than it is played out by the user system, thus building up audio/video data in the user buffer. For example, if the user's connection to the Internet is at 56,000 bits per second, and the data rate encoded for the media to be played is 24,000 bits per second, the buffer level of the user buffer 20 will fill at the rate of 32,000 bits per second (56,000 bits per second receive rate, minus 24,000 bits per second playout depletion rate).

If, for example, the server buffer 14 held one minute of audio/video data, eventually the user buffer 20 will hold one minute of audio/video data. The effect is that, over a brief period of time, the server buffer 14, or a designated portion of it, is transferred to the user buffer 20. The number of data elements in the server buffer 14 actually never changes, it always maintains one minute of audio/video data. However, for the particular user under discussion, a copy of all the data held in the buffer has been sent to the user. Since the user buffer 20 now holds one minute of audio/video data, it can play continuously despite data reception interruptions of less than a minute, and as soon as the interruption ceases the user buffer 20 can begin to rebuild, which will take place as fast as the connection between the user computer 18 and the server 12 will allow. The media player can continue to play out the audio/video material while the user buffer 20 rebuilds.

The predetermined buffer level in the user buffer 20 may be set at less than the predetermined buffer level of the server buffer 14 if desired. For example, the server buffer 14 might be set to hold one minute of media data, and the user buffer 20 might be set to hold thirty seconds of media data.

Alternatively, the user computer is replaced by an Internet radio or Internet Appliance, which is comprised of a dedicated processor for receiving Internet radio or audio/video material. Examples of such devices might range from familiar computing devices such as palmtops, PDAs (Portable Digital Assistants), and wireless phones, to devices that appear and operate similarly to conventional consumer electronic devices such as radios and televisions, but with the additional capability of Internet access.

Figure 2:
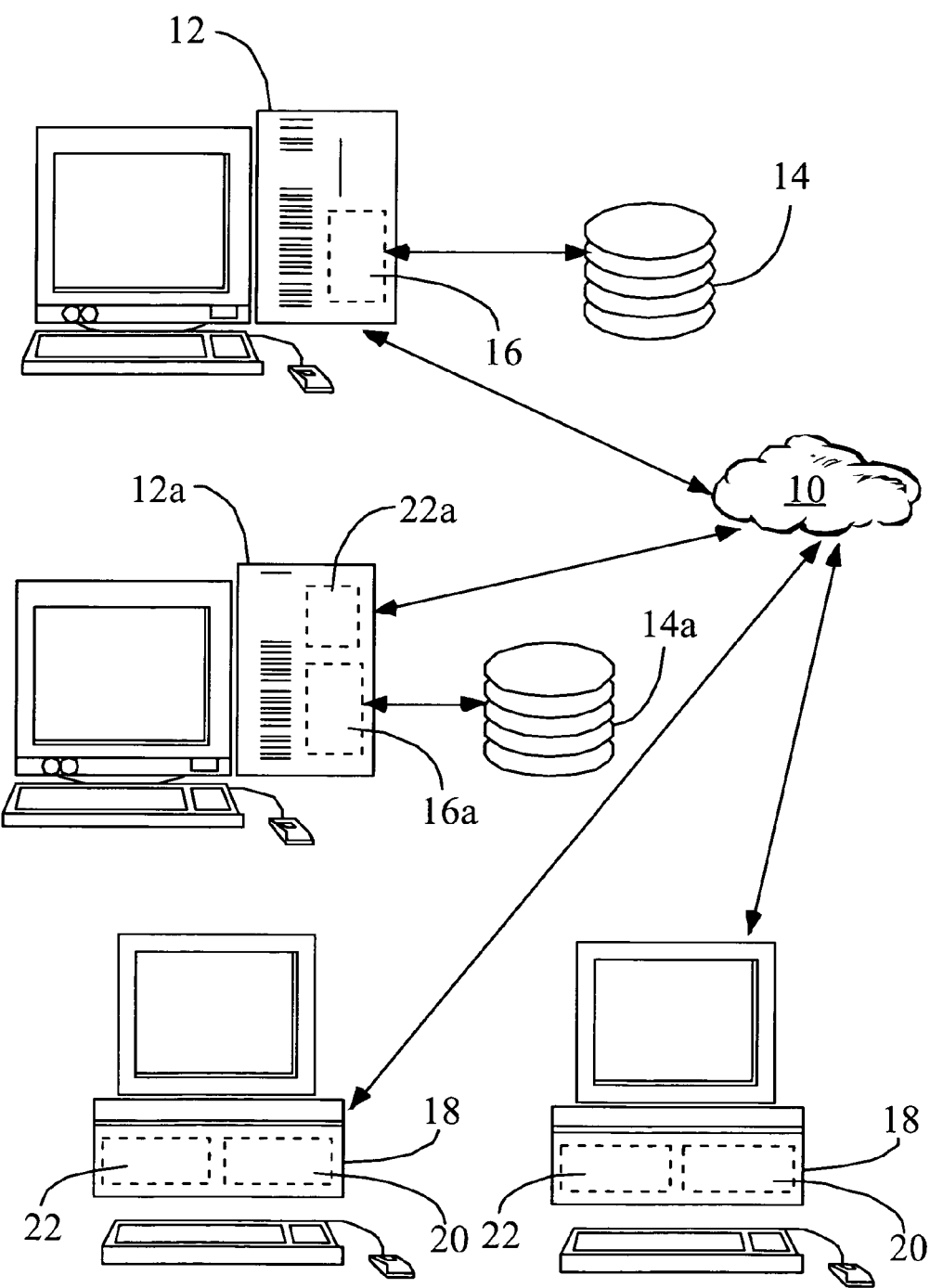
FIG. 2 is a schematic diagram of an alternative embodiment of the system shown by FIG. 1.

In another embodiment, as shown in FIG. 2, the media source may be remote from the server 12, such as a computer system 28 in a radio station studio. This computer includes a source manager 30 which may be implemented in software or firmware. The source manager 30 comprises means for: formatting media data according to the requirements of server 12, buffer 14, and buffer manager 16; and, for transmitting that media data to server 12. Source manager 30 may further include means for digitizing, encoding, and packetizing the media data. Media data typically is generated in real time such as by a speaker talking into a microphone or by playing a CD. Generally, computer system 28 transmits media data to server 12 in real time as the media data is generated. Buffering of media data might occur at computer system 28 for convenience of programming, but such buffering is incidental to the operation of the end-to-end system being described. Computer system 28 connects via the Internet 10, or other suitable data communications medium, to a server 12, wherein server buffer manager 16 receives the media data for input into the FIFO buffer 14 as described previously. Server 12, in turn, transmits the media data to one or more user computers 18, also as previously described.

In another embodiment, shown in FIG. 3, the invention provides a method for distributing from a server via the Internet streaming media composed of a plurality of time-sequenced data elements. Time-sequenced data elements are generated or received 32. Next, a predetermined number of the data elements is sequentially loaded 34 into a server buffer, which process of 32 and 34 continues indefinitely as long as there is media data available. Next, a group of the data elements is sequentially sent 36 via the Internet from the server buffer to a user computer connected to the Internet. Upon receipt by the user computer, the sent group of data elements is loaded 38 into a user buffer associated with the user computer. The user computer immediately plays 40 the received portion of the media on the user computer. At 42, if the user buffer is not full, then additional data elements are sent to the user computer 36. And also at 42, if the user buffer is full, the system waits until new media data is delivered to the server buffer 34. This process is repeated until the entire media file is played at the user computer.

Unlike conventional buffer arrangements, audio begins to play on the user system as soon as the user connection is made to the audio server. The user's buffer is built up while the audio is playing. Advantageously, the system and method of this invention create a faster than real time connection. That is to say, audio/video data is transmitted from the server faster than it is played out by the user system, thus building up audio/video data in the user buffer.

Having thus described the invention in rather full detail, it will be understood that such detail need not be strictly adhered to, but that additional changes and modifications may suggest themselves to one skilled in the art, all falling within the scope of the invention as defined by the sub-joined claims.

What is claimed is:

1. A system for distributing streaming media via the Internet, said streaming media being composed of a plurality of time-sequenced data elements, comprising:
   (a) a server connected to said data communications medium for transmitting said data elements;
   (b) a server buffer for storing up to a pre-determined number of said data elements for transmission;
   (c) means for supplying said server buffer with said data elements;
   (d) server buffer manager means for deleting the data element that is the oldest from said server buffer for each new data element to be received into said server buffer when said server buffer is full;
   (e) at least one user computer connected to said data communications medium;
   (f) transmission means associated with said server for sending said data elements stored in said server buffer to said user computer via said data communications medium;
   (g) a user buffer associated with said user computer and being provided with means for storing up to a predetermined number of said data elements, which predetermined number may be different from said predetermined number of data elements to be stored in said server buffer;
   (h) receiving means associated with said user computer for receiving data elements sent from said server via said data communications medium, and for storing said received data elements in said user buffer;
   (i) playing means for playing out audio/video material from said user buffer, said playing out comprising generating audio or video on said user computer from said data elements;
   (j) deleting means for deleting said played out data elements from said user buffer; and
   (k) sending means operative:
      (1) initially and whenever said user buffer is not full, to send data to fill said user buffer at a rate that is more rapid than the rate at which said data elements are played out by said user computer; and
      (2) whenever said user buffer is full, to send data elements from said server buffer to said user computer at about said rate that said data elements are played out by said user computer.

2. A system as recited by claim 1, wherein said means for supplying said server buffer with said data elements is a disk file.

3. A system as recited by claim 1, wherein said means for supplying said server buffer with said data elements is a source computer, providing said data elements as they are generated.

4. A system, as recited by claim 1, wherein said server sends said data elements to said user computer at a data rate as fast as the data connection between said server and said user computer will support when said user computer buffer is not full.

5. A system as recited by claim 1, wherein said user computer is an Internet radio or Internet Appliance.

6. A system as recited by claim 1, further comprising control means for said server to prevent sending said data elements to a user computer until said server buffer has stored said pre-determined number of data elements, wherein said pre-determined number comprises a plurality of data elements.

7. A system as recited by claim 1, further comprising pointer maintaining means for maintaining a record for each user computer of the last data element that had been sent by said server to said user computer, and for actuating said sending means when said user computer buffer is not full, to enable said sending means to send additional data elements to said user computer at a rate as fast as the connection between said server and said user computer will support, said pointer maintaining means being arranged to maintain said predetermined number of data elements in said user buffer.

8. A system as recited by claim 1, further comprising recording means for maintaining a record for each user computer of the last data element that had been received by said user computer, and, when said user computer buffer is not full, for requesting said sending means to send additional data elements to said user computer, said recording means arranged to maintain said pre-determined number of data elements in said user buffer, and said sending occurring at a rate as fast as the connection between said server and said user computer will support.

9. A method for distributing streaming media via the Internet from a server, said streaming media being composed of a plurality of time-sequenced data elements, comprising the steps of:
  (a) providing a plurality of time-sequenced data elements;
  (b) loading a predetermined number of said data elements into a server buffer causing it to be full;
  (c) when said server buffer is full with said predetermined number of said data elements, loading said server buffer with said data elements at a rate approximately equal to the rate at which said data elements are played out when converted to audio or video, and deleting from said server buffer the oldest data element each time a new data element is loaded into said buffer, the loading and deleting arrangement being adapted to maintain the predetermined number of data elements in said buffer;
  (d) sending via said data communications medium a group of said data elements sequentially from said server buffer to a user buffer of said user computer as fast as the connection between the server and the user computer will allow to initially fill said user buffer;
  (e) loading said sent group of data elements into said user buffer;
  (f) playing said media on said user computer as soon as said data elements first arrive, said played data elements being deleted from said user buffer;
  (g) while said user buffer is not full, sending the next sequential data elements from said server to said user computer at a rate as fast as the connection between said server and said user computer will support in such a manner that fills the user buffer to a predetermined number of data elements, and maintains that predetermined number of data elements in the buffer;
  (h) while said user buffer is full, sending the next sequential data elements to said user computer at a playback rate at which said data elements are played out when converted to audio or video in a manner that the user buffer is filled to a predetermined number of data elements, and maintains that predetermined number of data elements in the buffer; and
  (i) repeating steps "(b)" through "(h)" until all of said data elements of the streaming media are played by said user computer.

10. A method as recited by claim 9, wherein said user computer is an Internet radio or Internet Appliance.

11. A method for distributing streaming media via the Internet to at least one user system of at least one user, said streaming media comprising a plurality of sequential media data elements for a digitally encoded audio or video program, the user system being assumed to have a user buffer for receiving media data and facilities to play back said streaming media for viewing or listening by said at least one user as said media data elements arrive at said user system, said method comprising:
  sending to said user system said streaming media, to initially fill said user buffer at a rate more rapid than said streaming media is played out by said user system;
  detecting if said user buffer is full, during the transmission of said streaming media;
  if said user buffer is full, sending the next sequential media data elements to said user buffer at about said rate that said streaming media is played out by said user system;
  if said user buffer is not full, sending the next sequential media data elements to said user system at a rate more rapid than said streaming media is played out by said user system; and
  receiving said media data elements from a source thereof, into a server buffer, wherein said sending of said media data elements to said user system comprises sending media data elements read from said server buffer.

12. The method of claim 11, wherein said source is a disk file and said method further comprises reading said media data elements from said disk file into said server buffer.

13. The method of claim 11, wherein said source is a source computer that provides said data elements as they are generated, and said method further comprises receiving said media data elements from said source computer and loading said media data elements into said server buffer.

14. The method of claim 11, further comprising:
  initially placing, in said server buffer, a plurality of said media data elements, said plurality constituting a number of said media data elements sufficient to sustain playback of said streaming media by said user system for the duration of a specified period of delay or interruption in transmission;
  placing media data elements in said buffer in place of media data elements read out of said buffer; and
  maintaining the number of said media data elements in said buffer at or about said number of media data elements.

15. The method of claim 14, wherein said server buffer is a FIFO buffer, and wherein said step of initially placing said media data elements into said server buffer further comprises initially loading said media data elements into said server buffer, said step of reading said data elements from said server buffer further comprises reading said data elements, in the order of oldest data elements within said server buffer first.

16. The method of claim 14, wherein said server buffer comprises a portion of a larger buffer, further comprising moving said portion relative to said larger buffer in a time-sequenced manner, and wherein said step of reading said data elements from said server buffer further comprises reading said data elements sequentially from said portion.

17. The method of claim 14, further comprising delaying service of said streaming media in response to a request from said at least one user system for so long as may be necessary for said server buffer to acquire at least said number of said media data elements sufficient to sustain playback of said streaming media for the duration of said specified period of delay or interruption in transmission.

18. The method of claim 11, wherein said streaming media is simultaneously provided to a plurality of user systems, further wherein said user systems cannot be assumed to be making identical progress in receiving said streaming media at any given time during transmission, said method further comprising:
  maintaining a pointer into said server buffer for each said user, each said pointer indicating the last sequential media data element sent to said user; and
  using said pointers to identify which data elements in said server buffer will be sent respectively to each said user as said next sequential data elements.

19. The method of claim 11, wherein said streaming media is simultaneously provided to a plurality of user systems, further wherein said user systems cannot be assumed to be making identical progress in receiving said streaming media at any given time during transmission, and wherein it is assumed that each said user system sends back to said server an identifier identifying the last data element that said user system has received, said method further comprising:

assigning an identifier to each transmitted data element and transmitting said identifier to said user system together with said data element;

for each one of said plurality of users, receiving the identifier of the last data element sent to each said user; and sending the next sequential data elements to said user.

20. The method of claim 11, further comprising designating as free the space in said server buffer occupied by each said media data element as said media data element is read from said server buffer.

21. The method of claim 11, wherein said user buffer is considered full if at least one transport mechanism installed in said server has not reported that packets have not been received.

22. The method of claim 21, wherein said at least one transport mechanism is TCP.

23. A streaming media server providing a buffering system for distributing streaming media via the Internet to at least one user system of at least one user, said streaming media comprising a plurality of sequential media data elements for a digitally encoded audio or video program, and said user system being assumed to have a user buffer for receiving media data elements from said server and facilities to play back said streaming media for viewing or listening by said at least one user as said media data elements arrive at said user system, said streaming media server comprising:

memory for storing machine-readable executable routines and for providing a working memory area for routines executing on said server, a central processing unit for executing said machine-readable executable routines, an operating system, at least one communications port connected to said communications medium, and a communications system providing a set of communications protocols for communicating through said at least one port, said set of protocols including a transport protocol; and a machine-readable executable routine containing instructions to send said media data elements to said at least one user system, through one of said communications ports, using said transport protocol and said data communications medium, by communications steps comprising:

sending successive ones of said media data elements to initially fill said user buffer at a rate more rapid than said streaming media is played out by said user system;

detecting if said user buffer is full, during the transmission of said media;

if said user buffer is full, sending the next sequential data elements to said user buffer at about said rate that said streaming media is played out by said user system; and if said user buffer is not full, sending the next sequential data elements to said user system at a rate more rapid than said streaming media is played out by said user system.

24. The streaming media server of claim 23, further comprising a machine-readable executable routine containing instructions to establish a server buffer in said memory, and to receive said media data elements from a source thereof, into said server buffer, wherein said machine readable executable routine that performs the function of sending of said media data elements to said user system further comprises instructions whereby said media data elements that are sent to said user system are read from said server buffer.

25. The streaming media server of claim, 24, wherein said source is a disk file, and said machine-readable executable routine for receiving said media elements from said source comprises instructions for reading said media data elements from said disk file into said server buffer.

26. The streaming media server of claim, 24, wherein said source is a source computer that provides said data elements as they are generated, and said machine- readable executable routine for receiving said media elements from said source comprises instructions for receiving said media data elements from said source computer and loading said media data elements into said server buffer.

27. The streaming media server of claim 24, further comprising a machine-readable, executable routine containing instructions to cause said server to manage said server buffer by buffer management steps comprising:

initially placing, in said server buffer, a plurality of said media data elements, said plurality constituting a number of said media data elements sufficient to sustain playback of said streaming media by said at least one user for the duration of a specified period of delay or interruption in transmission, placing sequential media data elements in said buffer in place of media data elements read out of said buffer, and maintaining the number of said media data elements in said buffer at or about said number of data elements.

28. The streaming media server of claim 23, wherein said machine-readable executable routine for reading and sending media data elements to said at least one user system is configured to send data simultaneously to a plurality of user systems, wherein said user systems cannot be assumed to be making identical progress in receiving said streaming media at any given time during transmission, and further comprises:

instructions for maintaining a pointer into said server buffer for each said user, each said pointer indicating the last media data element sent to said user; and instructions for using said pointers to identify which media data elements is said server buffer will be sent respectively to each said user as said next sequential data elements.

29. The streaming media server of claim 24, wherein said server buffer is a FIFO buffer.

30. The streaming media server of claim 24, wherein said server buffer comprises a portion of a larger buffer that is movable with respect to said larger buffer.

31. The streaming media server of claim 23, wherein said machine-readable executable routine for reading and sending media data elements to said at least one user system is configured to send data simultaneously to a plurality of user systems, wherein said user systems cannot be assumed to be making identical progress in receiving said streaming media at any given time during transmission, and further comprises:

instructions for assigning identifiers to each transmitted data element;

instructions for receiving, for each one of said plurality of users, the identifier of the last data element sent to each said user, through said server's data transport mechanism; and instructions for sending the next sequential data elements to said user.

32. The streaming media server of claim 23, said steaming media server being adapted to support communications with a user system in the form of an Internet radio or appliance.

33. The streaming media server of 23, wherein said communications system comprises an Internet Protocol suite.

34. The streaming media server of claim 23, wherein said transport protocol is TCP.

35. The streaming media server of claim 23, wherein said machine-readable executable routine for reading and sending media data elements to said at least one user system is configured to perform said steps of initially filling said user system buffer, and of refilling said user system buffer when said user system buffer is not full, by sending said media data elements at a data rate as fast as the data connection between said server and said user computer will support.

36. A non-transitory machine-readable medium on which there has been recorded a computer program for use in operating a server for distributing streaming media comprising a plurality of sequential media data elements via the Internet to at least one user system of at least one user, said user system being assumed to have a user buffer for receiving media data and facilities to play back said streaming media for viewing or listening by said at least one user as said media data elements arrive at said user system, said program recorded on said machine readable medium comprising:
- a routine directing said server to send streaming media comprising a plurality of sequential media data elements, to initially fill said user buffer at a rate more rapid than said streaming media is played out by said user system;
- instructions to detect if said user buffer is full, during the transmission of said media;
- instructions operable if said user buffer is full, to send the next sequential data elements to said user buffer at about said rate that said streaming media is played out by said user system;
- instructions operable if said user buffer is not full, to send the next sequential data elements to said user system at a rate more rapid than said streaming media is played out by said user system; and
- a routine containing instructions to establish a server buffer in said memory, and to receive said media data elements from a source thereof, into said server buffer, and wherein said routine directing said server to send streaming media to said user system further comprises instructions whereby said media data elements that are sent to said user system are read from said server buffer.

37. The machine readable medium of claim 36, wherein said source is a disk file, and said routine for receiving said media elements from said source comprises instructions for reading said media data elements from said disk file into said server buffer.

38. The machine readable medium of claim 36, wherein said source is a source computer that provides said data elements as they are generated, and said routine for receiving said media elements from said source comprises instructions for receiving said media data elements from said source computer and loading said media data elements into said server buffer.

39. The machine-readable medium of claim 36, wherein the computer program recorded on said medium is adapted to simultaneously provide said media data elements to a plurality of user systems, and wherein said user systems cannot be assumed to be making identical progress in receiving said streaming media at any given time during transmission, and further wherein said routine for managing said server buffer further comprises:
- instructions for maintaining a pointer into said server buffer for each said user, each said pointer indicating the last sequential media data element sent to said user; and
- instructions for using said pointers to identify which data elements in said server buffer will be sent respectively to each said user as said next sequential data elements.

40. The machine-readable medium of claim 36, wherein the computer program recorded on said medium is adapted to simultaneously provide said media data elements to a plurality of user systems, wherein said user systems cannot be assumed to be making identical progress in receiving said streaming media at any given time during transmission, and further wherein said routine for managing said server buffer further comprises:
- instructions for assigning identifiers to each transmitted data element;
- instructions for receiving, for each one of said plurality of users, the identifier of the last data element sent to each said user, through said server's data transport mechanism; and
- instructions for sending the next sequential data elements to said user.

41. The machine-readable medium of claim 36, wherein said computer program recorded on said machine-readable medium further comprises instructions to delay service of said streaming media in response to a request from said at least one user system for so long as may be necessary for said server buffer to acquire at least said number of said media data elements sufficient to sustain playback of said streaming media for the duration of said specified period of delay or interruption in transmission.

42. A non-transitory machine-readable medium on which there has been recorded a computer program for use in operating a server for distributing streaming media comprising a plurality of sequential media data elements via the Internet to at least one user system of at least one user, said user system being assumed to have a user buffer for receiving media data and facilities to play back said streaming media for viewing or listening by said at least one user as said media data elements arrive at said user system, said program recorded on said machine readable medium comprising:
- a routine directing said server to send streaming media comprising a plurality of sequential media data elements, to initially fill said user buffer at a rate more rapid than said streaming media is played out by said user system;
- instructions to detect if said user buffer is full, during the transmission of said media; instructions operable if said user buffer is full, to send the next sequential data elements to said user buffer at about said rate that said streaming media is played out by said user system;
- instructions operable if said user buffer is not full, to send the next sequential data elements to said user system at a rate more rapid than said streaming media is played out by said user system; and
- a routine directing said server to manage said server buffer in said server by buffer management steps comprising:
  - initially placing, in said server buffer, a plurality of said media data elements, said plurality constituting a number of said data media elements sufficient to sustain playback of said streaming media by said user system for the duration of a specified period of delay or interruption in transmission,
  - placing sequential data elements in said buffer in place of media data elements read out of said buffer, and maintaining the number of said media data elements in said buffer at or about said first number of media data elements.

43. The machine-readable medium of claim 42, wherein said routine for managing said server buffer further comprises instructions to designate as free the space in said server buffer occupied by each said media data element as said media data element is read from said buffer.

44. The machine-readable medium of claim 42, wherein said server buffer is a FIFO buffer, and wherein said routine for managing said server buffer further comprises instructions for initially loading said media data elements into said server buffer, and instructions for reading said media data elements from said server buffer, in the order of oldest data elements within said server buffer first.

45. The machine-readable medium of claim 42, wherein said server buffer is a portion of a larger buffer, and wherein said routine for managing said server buffer further comprises instructions for moving said portion relative to said larger buffer in a time- sequenced manner, and further wherein said instructions for reading said data elements from said server buffer further comprises reading said data elements sequentially from said portion.

46. The machine-readable medium of claim 42, wherein said computer program recorded on said machine-readable medium is adapted to consider said user buffer full if at least one server-provided transport mechanism has not reported that packets have not been received.

47. The machine-readable medium of claim 46, wherein said at least one transport mechanism is TCP.

* * * * *